(12) United States Patent
Watanabe et al.

(10) Patent No.: US 7,562,733 B2
(45) Date of Patent: Jul. 21, 2009

(54) RADIATOR CORE SUPPORT

(75) Inventors: Toshiharu Watanabe, Tokyo (JP); Hideki Kobayashi, Tokyo (JP); Shinji Araki, Tokyo (JP); Osamu Ito, Tokyo (JP); Eiichi Mori, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 244 days.

(21) Appl. No.: 11/637,244

(22) Filed: Dec. 12, 2006

(65) Prior Publication Data

US 2007/0151784 A1 Jul. 5, 2007

(30) Foreign Application Priority Data

Dec. 13, 2005 (JP) .............................. 2005-358370

(51) Int. Cl.
*B60K 11/04* (2006.01)
(52) U.S. Cl. .................. 180/68.4; 180/68.1; 165/67
(58) Field of Classification Search ................ 180/68.4, 180/68.1, 69.2, 311; 296/188, 203.03, 205, 296/203.02, 193.09, 187.09; 293/133, 120, 293/132, 122; 165/67, 68, 76
See application file for complete search history.

(56) References Cited

U.S. PATENT DOCUMENTS

| 5,575,526 | A  | * | 11/1996 | Wycech ...................... 296/205 |
| 6,502,874 | B2 | * | 1/2003  | Kajiwara et al. ............. 293/133 |
| 6,540,037 | B2 | * | 4/2003  | Sasano et al. ............... 180/68.1 |
| 6,578,650 | B2 | * | 6/2003  | Ozawa et al. ............... 180/68.1 |
| 6,681,876 | B1 | * | 1/2004  | Haneda et al. ............. 180/68.4 |
| 6,715,573 | B2 | * | 4/2004  | Emori et al. ................ 180/68.4 |
| 6,729,424 | B2 | * | 5/2004  | Joutaki et al. .............. 180/68.4 |
| 6,742,615 | B2 | * | 6/2004  | Cristante et al. ........... 180/68.4 |
| 6,827,129 | B2 | * | 12/2004 | Ozawa et al. ............... 180/68.4 |
| 7,350,609 | B2 | * | 4/2008  | Udo et al. .................. 180/68.4 |

FOREIGN PATENT DOCUMENTS

| DE | 41 00 483 A1   | 7/1992  |
| EP | 0 658 470 A1   | 6/1995  |
| JP | 5-105115       | 4/1993  |
| JP | 10-264855 A    | 10/1998 |
| JP | 2002-037130 A  | 2/2002  |
| JP | 2003-300483    | 10/2003 |

* cited by examiner

*Primary Examiner*—Hau V Phan
(74) *Attorney, Agent, or Firm*—Foley & Lardner LLP

(57) ABSTRACT

A radiator core support includes a radiator core support main body that is made of plastic material, a right fixing member and a left fixing member that are made of metal, and a first metal frame. The right fixing member and the left fixing member are fixed on a right side member and a left side member of a motor vehicle body, respectively. The first metal frame extends in a lateral direction of the motor vehicle body so as to connect the right fixing member and the left fixing member with each other and support the radiator core support main body.

14 Claims, 10 Drawing Sheets

RADIATOR CORE SUPPORT

BACKGROUND OF THE INVENTION

1. Field of the Invention

The present invention relates to a radiator core support that is made of a combination of metal members and plastic material for supporting a heat exchanger and is adapted for a motor vehicle.

2. Description of the Related Art

Some of conventional radiator core supports adapted for motor vehicles are constructed so that all parts of the radiator core supports are made from either one of plastic material and metal material. The radiator core supports entirely made from the metal material ensure high rigidity at any portions thereof, but they are too heavy in weight. The radiator core supports entirely made from the plastic material can decrease their weight, but they usually have a portion of low rigidity.

In order to obtain radiator core supports with lighter weight and lower rigidity, conventional radiator core supports, made of a combination of metal members and plastic material, are used. Specifically, the metal members are used at low-rigidity portions of the radiator core support entirely made of the plastic material, instead of using their corresponding portion made of the plastic material or with using their corresponding portion made of the plastic material.

Such conventional radiator core supports are disclosed in Japanese patents laid-open publication No. 2002-37130, No. (Tokkaihei) 10-264855, No. 2003-300483, and No. (Tokkaihei) 05-105115.

The above known conventional radiator core supports, however, encounter problems in that there is room for improvement in the rigidity and the weight of the conventional radiator supports, because the rigidity of the conventional core supports are improved by replacing only weak plastic portions thereof with metal members and/or adding the metal members to the weak plastic portions, allowing for only the weak portions in part, not entirely. On the other hand, they have excessive thickness and/or configuration, wasting their material.

It is, therefore, an object of the present invention to a provide radiator core support which overcomes the foregoing drawbacks and can strengthen rigidity and decrease weight and excessive portion of an entire radiator core support more than the conventional radiator core supports using the plastic material and the metal members, thereby improving stability and controllability of a motor vehicle.

SUMMARY OF THE INVENTION

According to a first aspect of the present invention there is provided radiator core support including a radiator core support main body, a right fixing member, a left fixing member, a first metal frame, a second metal frame and a fixing member. The radiator core support main body is a panel made of plastic material, and the radiator core main body is formed with a through-hole. The right fixing member and the left fixing member are made of metal to be fixed on a right side member and a left side member of a motor vehicle body, respectively. The first metal frame extends in a lateral direction of the motor vehicle body for connecting the right fixing member and the left fixing member with each other and for supporting the radiator core support main body. The second metal frame is connected with the first metal frame to extend vertically at an intermediate portion of the first metal frame, the second metal portion being provided with a fixing portion having a through-hole for fixing a heat exchanger through the through-hole of the radiator core main body. The fan fixing member is connected with the first metal frame and the fan fixing member is configured to fixing a fan motor.

Therefore, the radiator core support of the invention can strengthen rigidity and decrease weight and excessive portions of an entire radiator core support more than the conventional radiator core supports using the plastic material and the metal members, because the metal right and left fixing members fixed to the motor vehicle body are connected by the first metal frame. This also increases rigidity of the motor vehicle body, thereby improving stability and controllability of a motor vehicle. The heat exchanger can be tightly and stably supported by the first metal frame and the second metal frame. In addition, the fan motor can be tightly supported by the first metal frame, and rigidity of the first metal frame can be improved at the same time.

Preferably, a hood lock is fixed on a hood-lock fixing member provided on a top portion of the second metal frame.

Therefore, the hood lock and an engine hood can be tightly and stably supported by the first metal frame and the second metal frame.

Preferably, the supported object includes a hood lock and a heat exchanger, and the second metal frame extends vertically to have a first fixing portion at a top portion of the second metal frame and extends in the lateral direction to have a second fixing portion for fixing a bottom portion of the heat exchanger.

Therefore, the heat exchanger, the hood lock and the engine hood can be tightly and stably supported by the first metal frame and the second metal frame.

Preferably, the first metal frame includes two beams arranged apart vertically from each other and in parallel with each other.

Therefore, the first metal frame can be built in lower weight and at low manufacturing cost, keeping higher rigidity of the radiator core support.

Preferably, the first metal frame includes two beams arranged vertically and in parallel with each other and fixing the second metal frame.

Therefore, the second metal frame can be tightly supported by the two beams.

Preferably, the first metal frame includes two beams arranged apart vertically from each other and in parallel with each other, and intermediate portions thereof are fixed with the fan fixing member.

Therefore, the fan motor can be tightly supported by the two beams and the fan fixing member at low manufacturing costs and in lower weight, and rigidity of the first metal frame can be improved at the same time.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
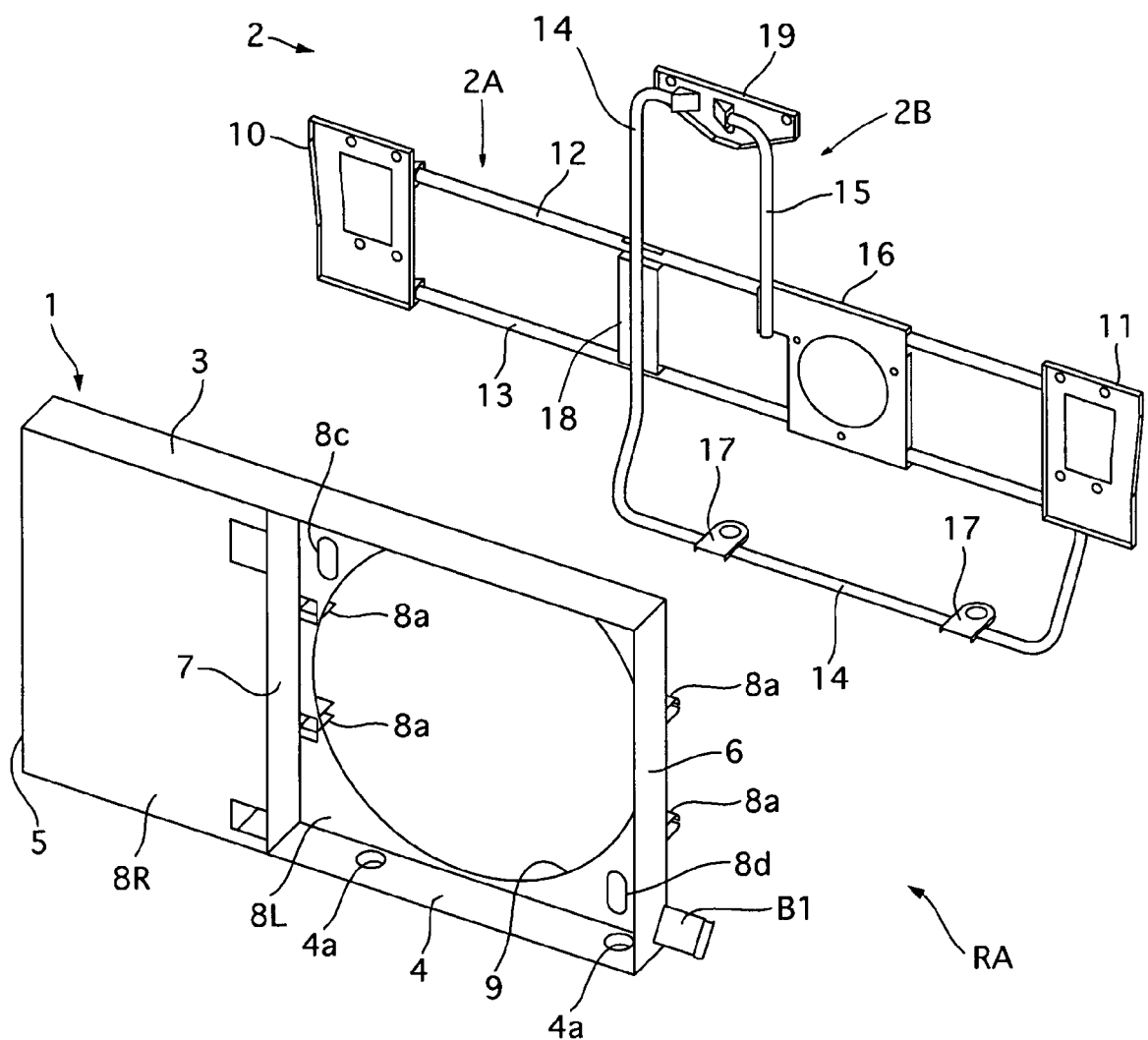
FIG. 1 is an exploded perspective front view showing a radiator core support of an embodiment according to the present invention.

Throughout the following detailed description, similar reference characters and numbers refer to similar elements in all figures of the drawings, and their descriptions are omitted for eliminating duplication.

A radiator core support of an embodiment according to the present invention will be described with reference to the accompanying drawings.

Figure 2:
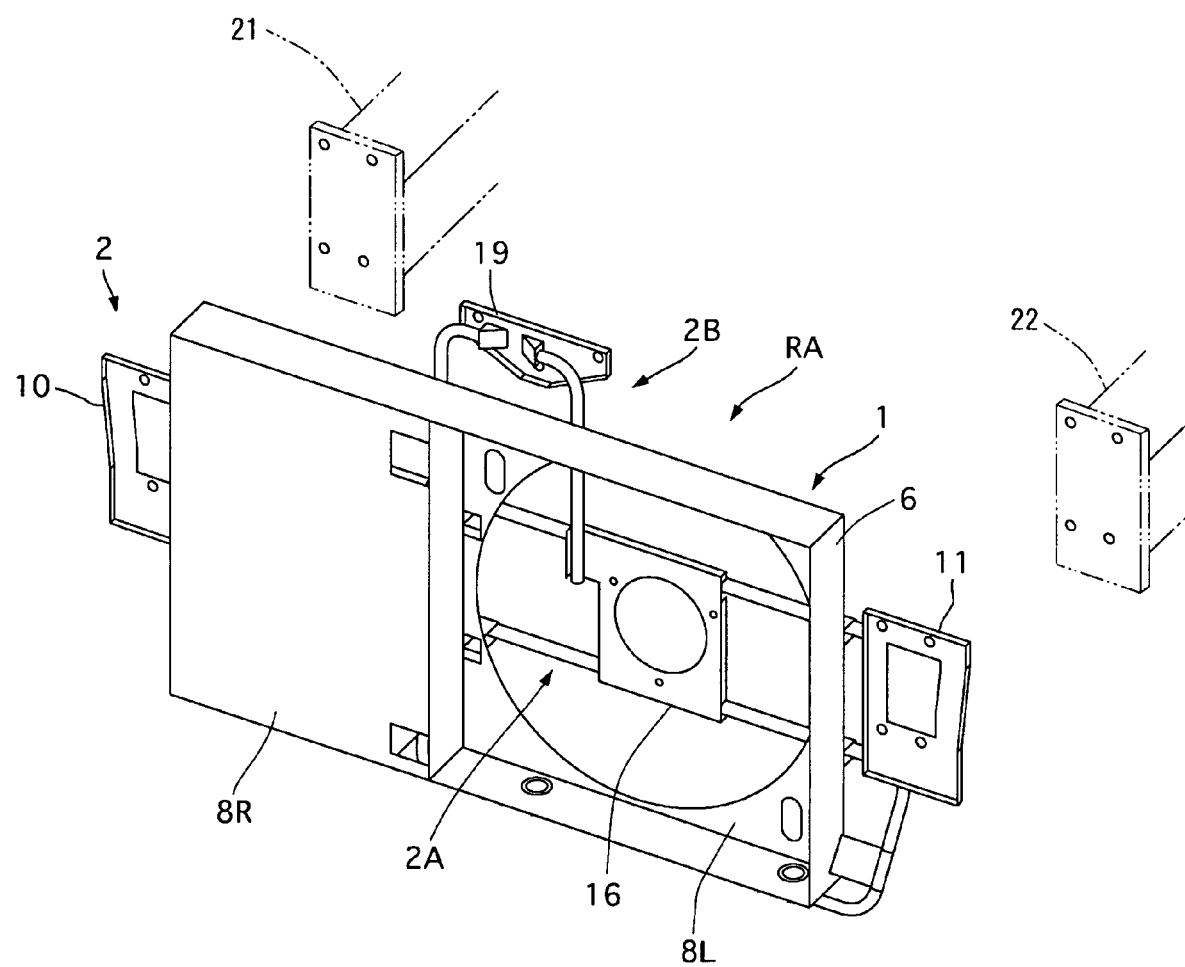
FIG. 2 is a perspective front view showing the radiator core support of the embodiment.
Figure 3:
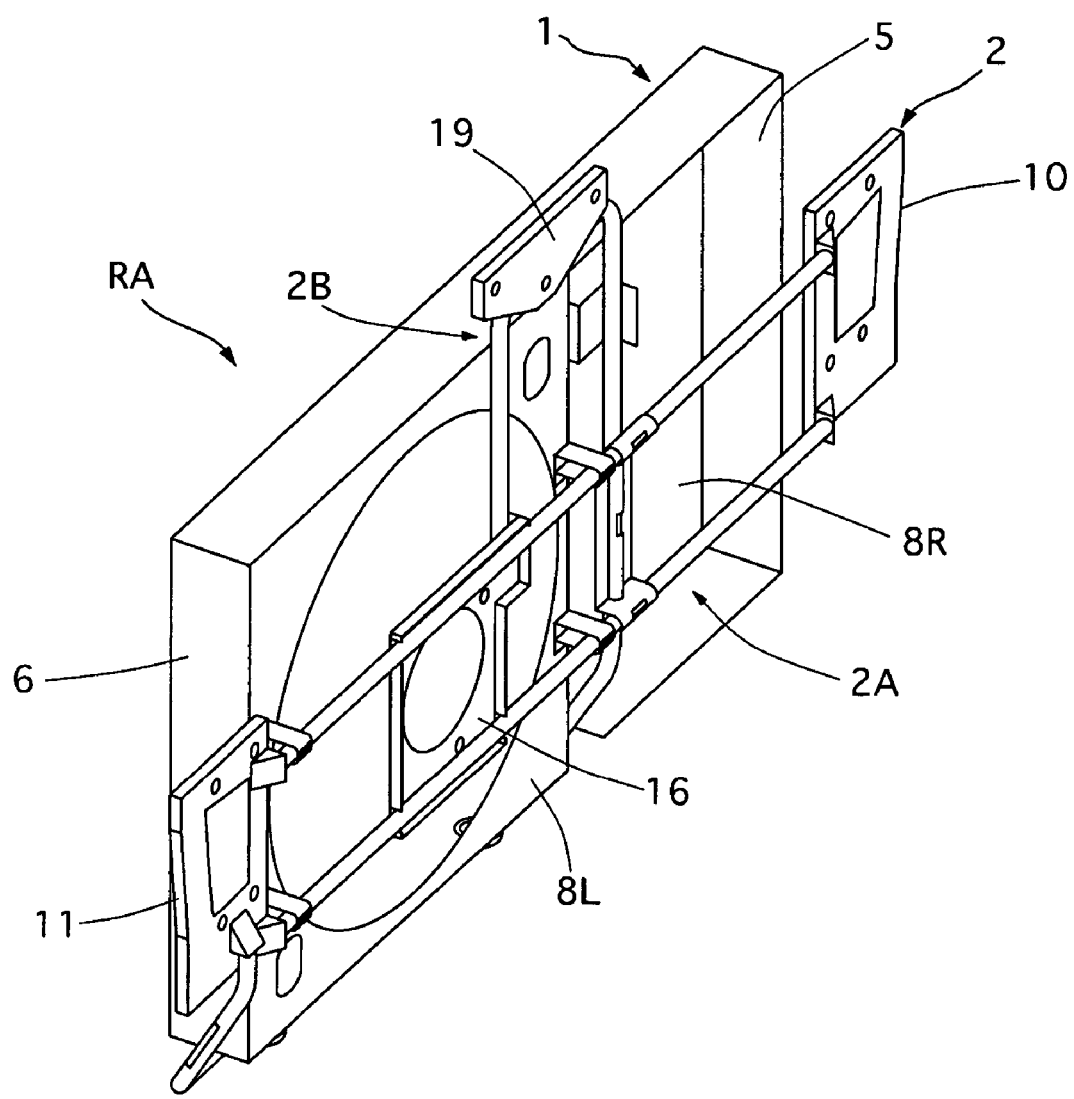
FIG. 3 is a perspective rear view showing the radiator core support of the embodiment.

Referring to FIGS. 1 to 3 of the drawings, there is shown the radiator core support of the embodiment. Note that terms "left" and "right", used hereinafter, respectively indicate those with respect with a motor vehicle body, not in the attached Figures.

The radiator core support RA has a radiator core support main body 1 integrally made of plastic material and a metal part 2 including a first metal frame 2A and a second metal frame 2B. The first metal frame 2A consists of an upper beam 12 and a lower beam 13, and the second metal frame 2B consists of a first beam 14 and a second beam 15.

As shown in FIGS. 1 to 4, the radiator core support main body 1 has a radiator core support upper panel portion 3, a radiator core support lower panel portion 4, a radiator core support right side panel portion 5, a radiator core support left side panel portion 6, a partition panel portion 7, a right fan-shroud panel portion 8R, and a left fan-shroud panel portion 8L. The radiator core support main body 1 is integrally made of the plastic material by using a not-shown injection molding machine for example.

The radiator core support upper panel portion 3 is formed like a plate and extends in a lateral direction when the radiator core is mounted on a front portion of the motor vehicle body. The radiator core support lower panel portion 4 is formed like a plate and extends under and in parallel with the radiator core support upper panel portion 3.

The radiator core support right side panel portion 5 and the radiator core support left side panel portion 6 are formed like a plate, and extend vertically to integrally connect right end portions of the radiator core support upper panel portion 5a and the radiator core support left side panel portion 6 left end portions thereof, respectively.

The partition panel portion 7 is formed like a plate and extends vertically to integrally connect the inner sides of the radiator core support upper panel portion 3 and the radiator core support lower panel portion 4 at their intermediate portions. The partition panel portion 7 is also integrally connected with the right fan-shroud panel portion 8R at its front end portion and is integrally connected with the left fan-shroud panel portion 8L at its rear end portion.

Figure 7:
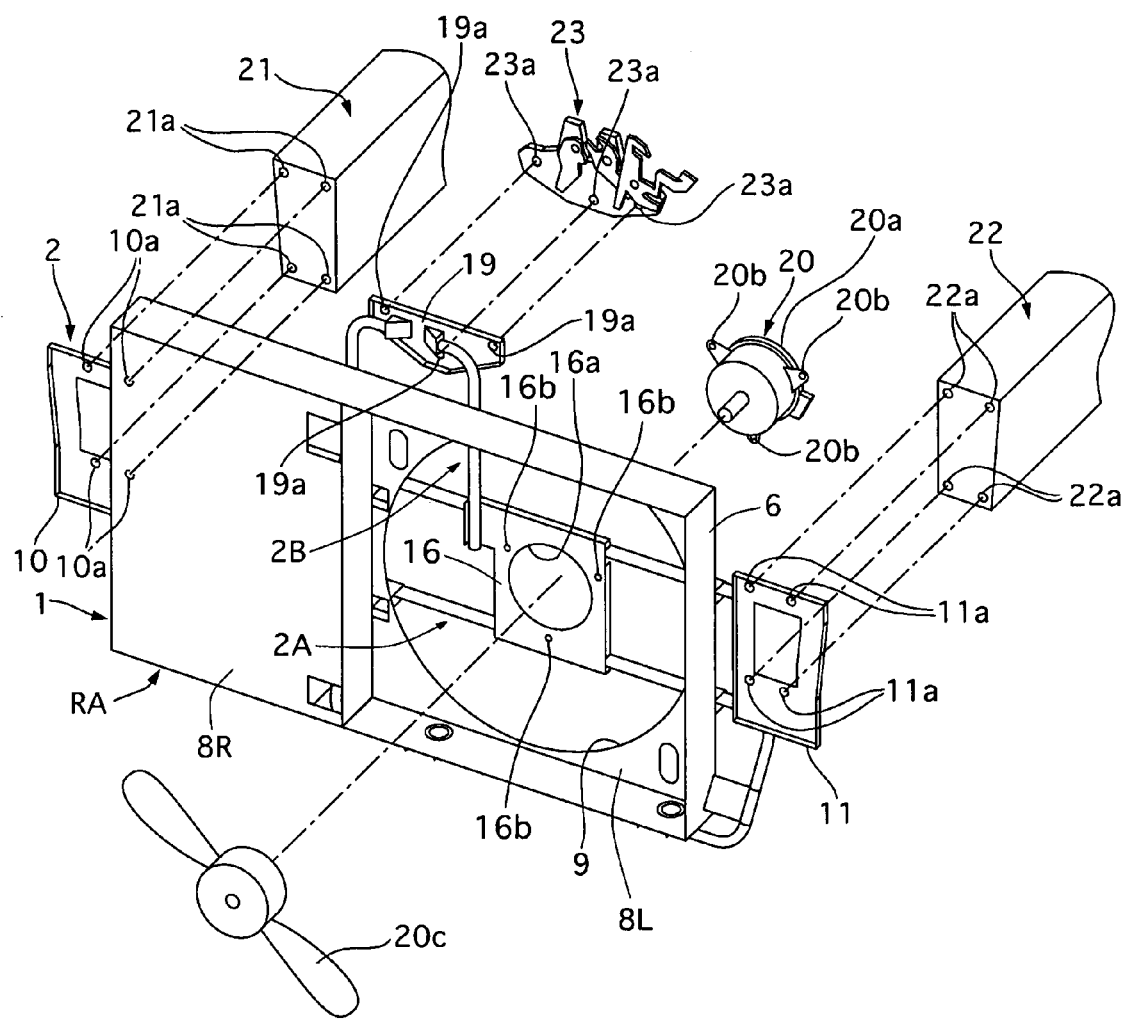
FIG. 7 is a perspective front view showing the radiator core support of the embodiment before it is attached to a motor vehicle body and a fan motor and a hood lock are mounted on the radiator core support.
Figure 8:
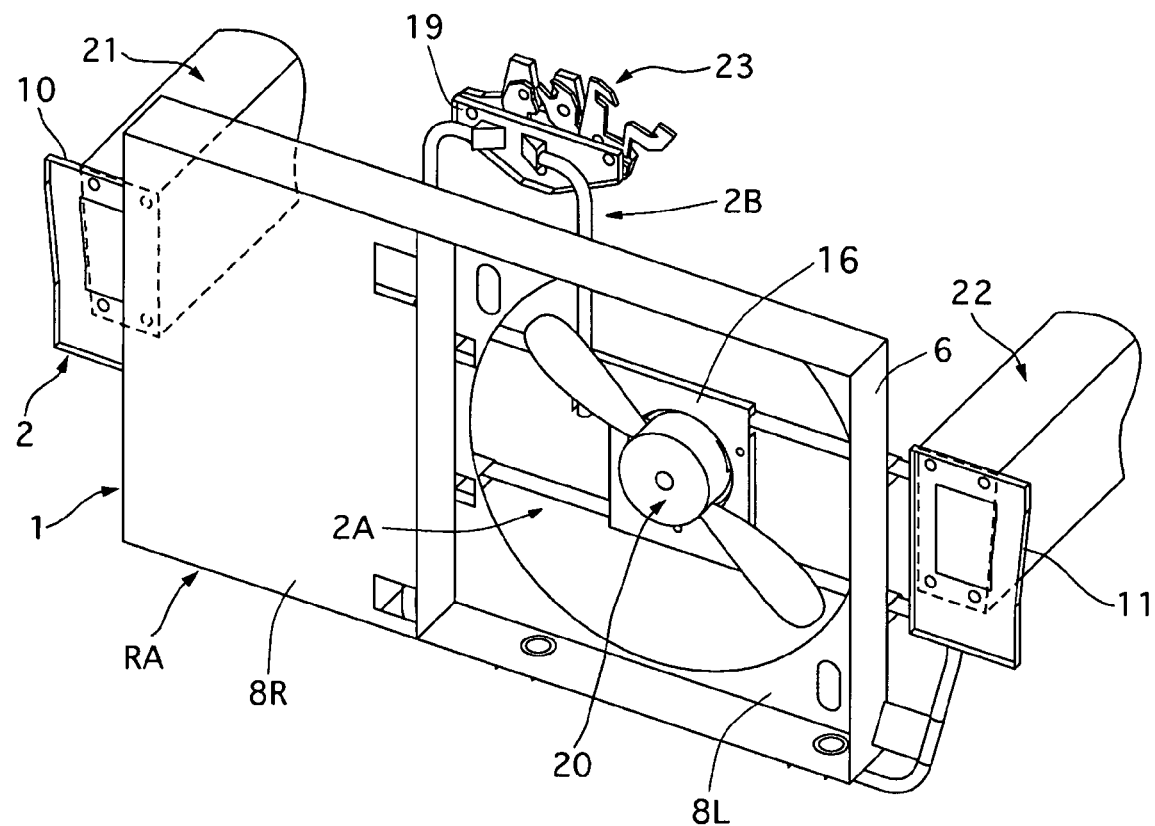
FIG. 8 is a perspective front view showing the radiator core support when it is attached to the motor vehicle body and is attached with the fan motor and the hood lock after a state shown in FIG. 7.

The right fan-shroud panel portion 8R is located at a front side of the radiator core support main body 1 so as to be integrally connected with the front end portions of the radiator core support upper panel portion 3, the radiator core support lower portion 4, the radiator core support right side panel portion 5 and the partition panel portion 7. The left fan-shroud panel portion 8L is located at a rear side of the radiator core support main body 1 so as to be integrally connected with the rear end portions of the radiator core support upper panel portion 3, the radiator core support lower portion 4, the radiator core support left side panel portion 5 and the partition panel portion 7. The left fan-shroud panel portion 8L is formed at its center portion with an opening for receiving a fan motor unit 20, which is shown in FIGS. 7 to 9.

Figure 4:
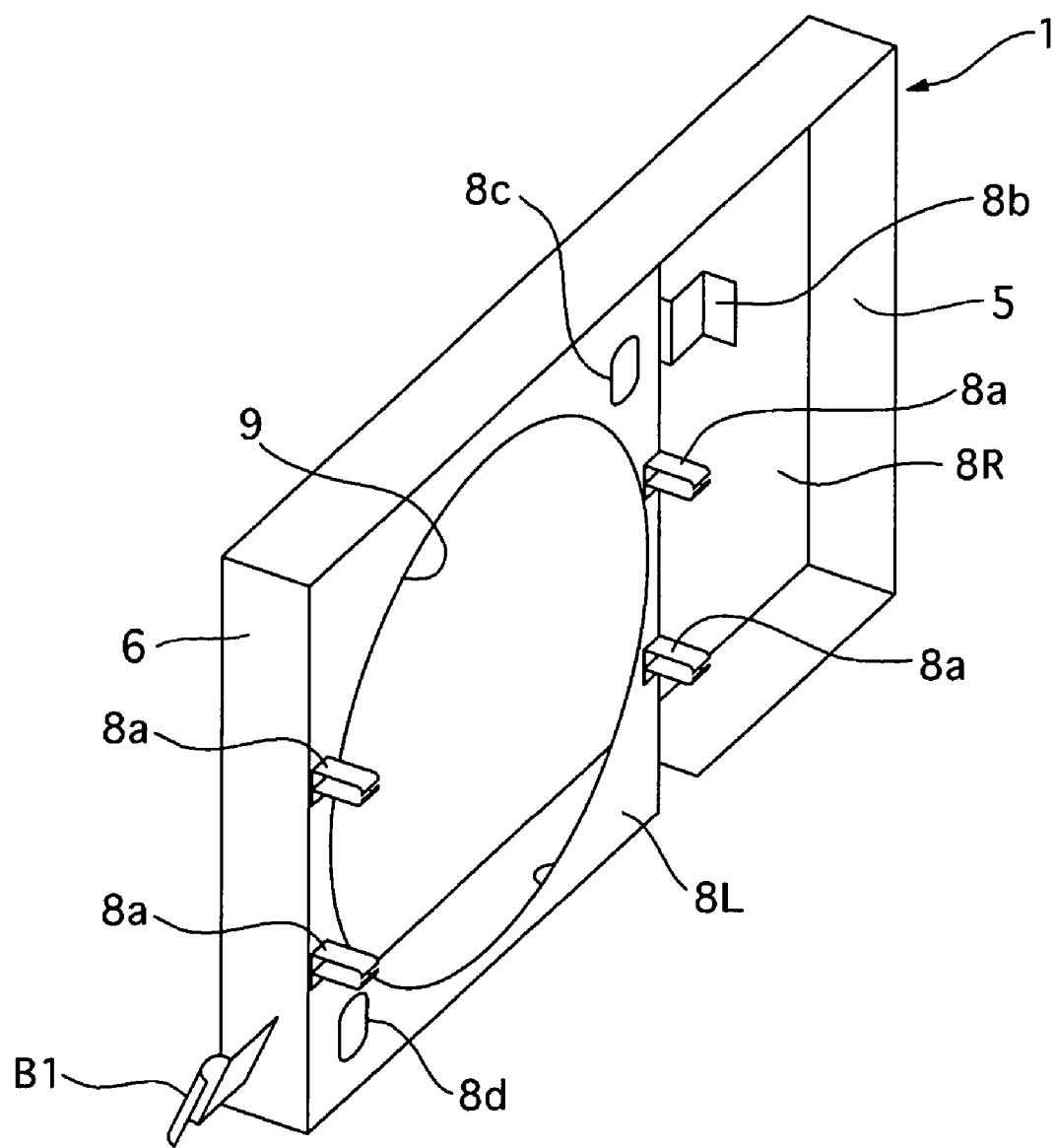
FIG. 4 is a perspective rear view showing a radiator core support main body constituting the radiator core support of the embodiment.

As shown in FIG. 4, four pairs of clipping portions 8a, each pair consisting of an upper clipping portion and a lower clipping portion, are projected rearward from a rear surface of the left fan-shroud panel portion 8L and around its opening 9 for holding the upper beam 12 and the lower beam 13 of the first metal frame 2A. Two pairs of the clipping portions 8a are arranged vertically apart from each other at a right side of the opening 9, while the other two pairs thereof are arranged vertically apart from each other at a left side of the opening 9. The partition panel portion 7 is formed with a supporting portion 8b shaped like a letter L, which projects from a rear surface of the partition panel portion 7 in a right direction and bending rearward therefrom.

Figure 9:
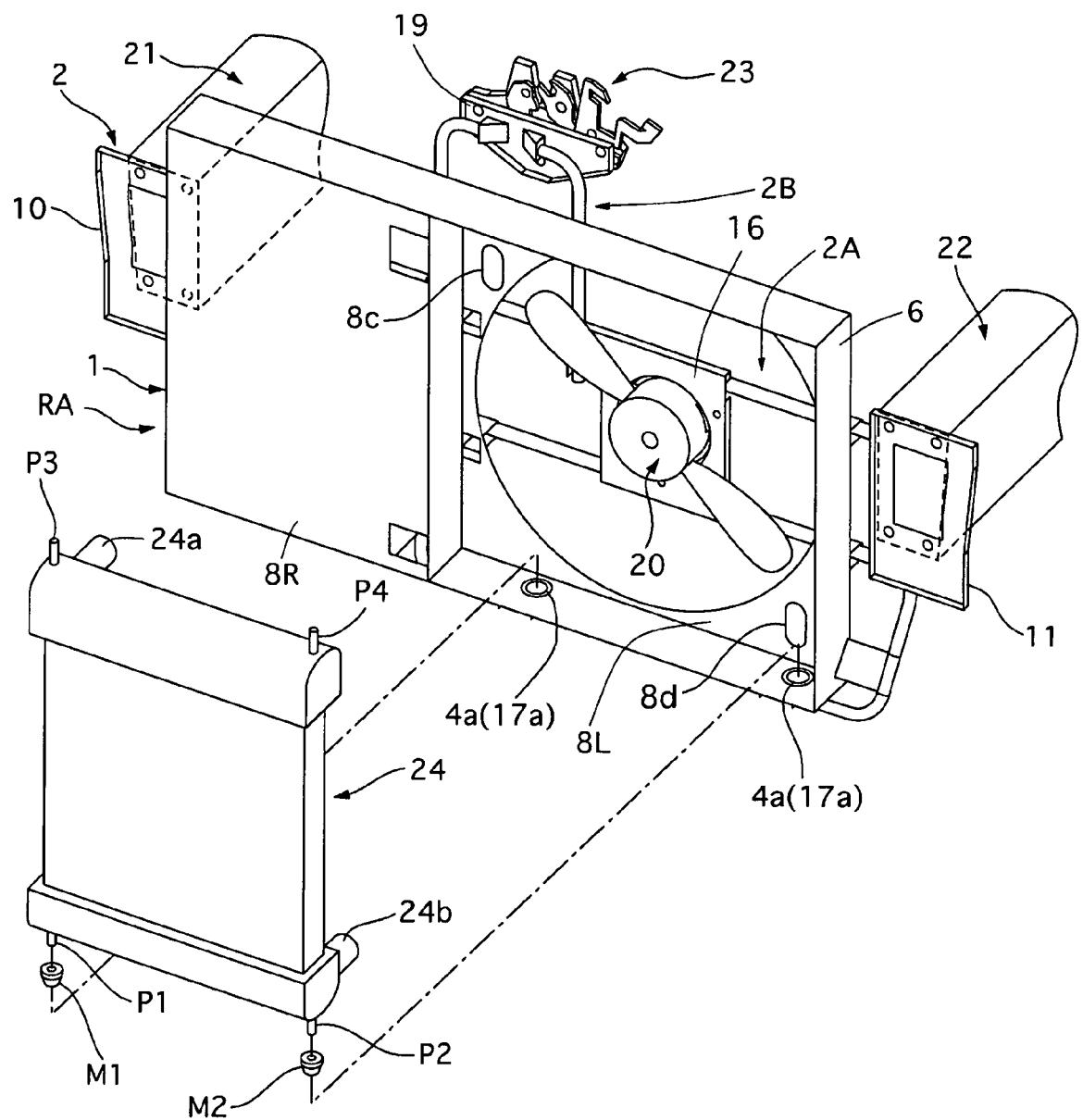
FIG. 9 is a perspective front view showing the radiator core support of the embodiment when a heat exchanger is about to be mounted on the radiator core support after a state shown in FIG. 8.
Figure 10:
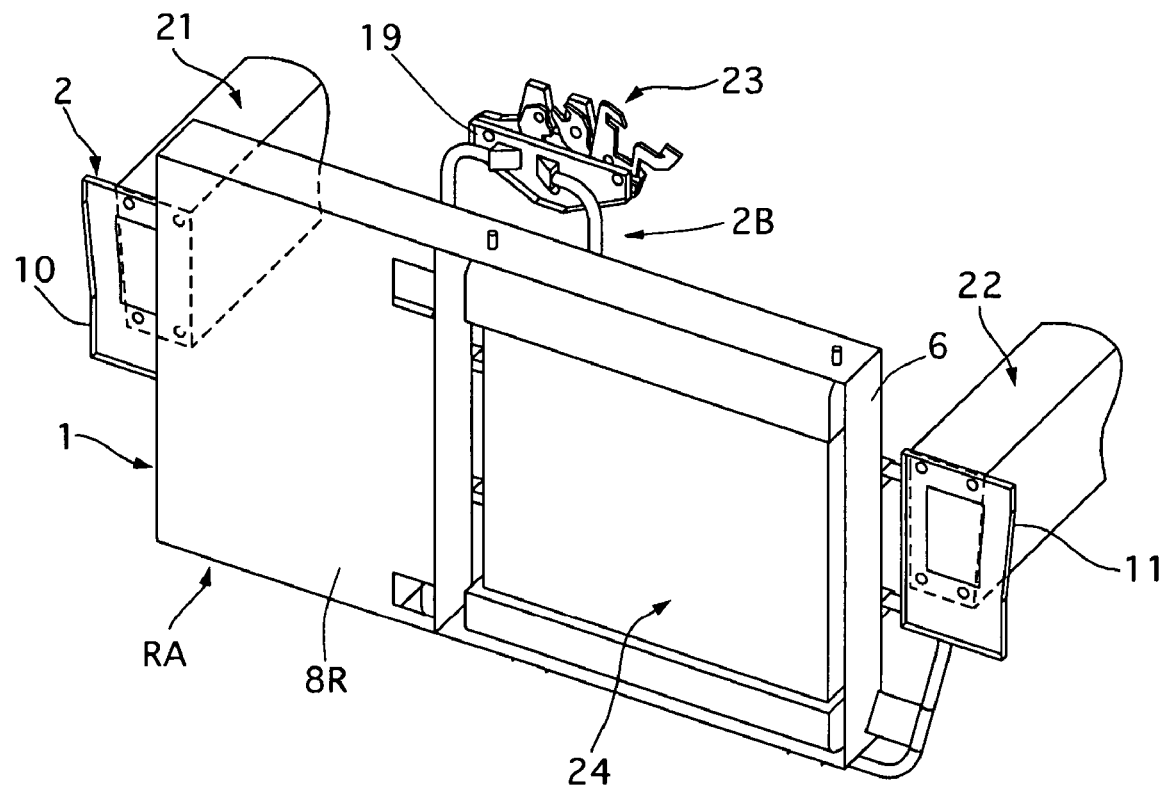
FIG. 10 is a perspective front view showing the radiator core support of the embodiment after the heat exchanger is mounted on the radiator core support.

The radiator core support lower panel portion 4 is provided with two through-holes 4a for receiving two mounting pins P1 and P2 which are apart from each other in the lateral direction and are projected from a bottom surface of a heat exchanger 24, such as a radiator, shown in FIGS. 9 and 10.

The radiator core support left side panel portion 6 is provided with a holding bracket portion B1 projecting from an outer surface thereof outwardly in the lateral direction for the second metal frame 2B.

Figure 5:
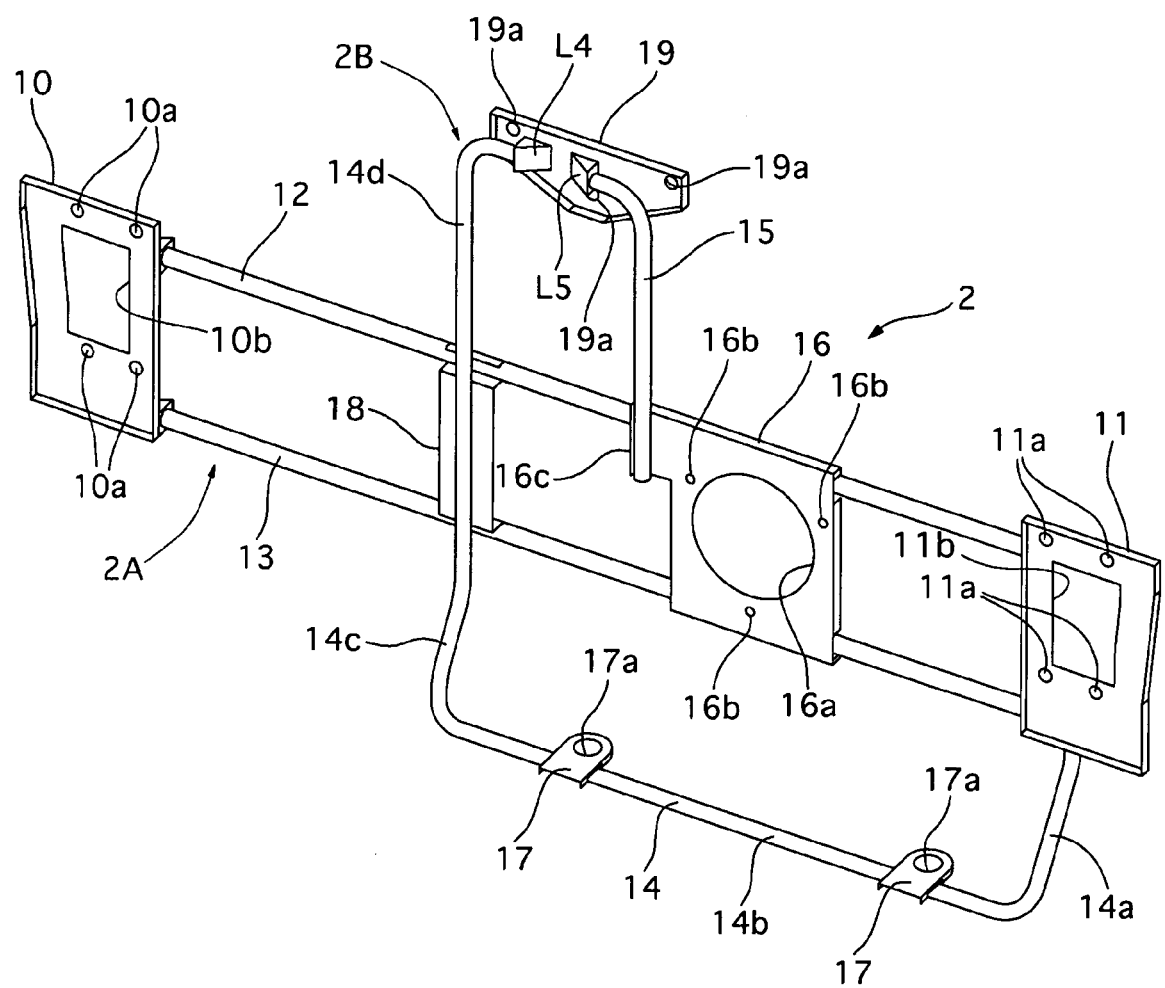
FIG. 5 is a perspective front view showing a first metal frame having a right fixing panel, a left fixing panel and a fan fixing panel, and a second metal frame having a hood-lock fixing panel, each constituting the radiator core support of the embodiment.
Figure 6:
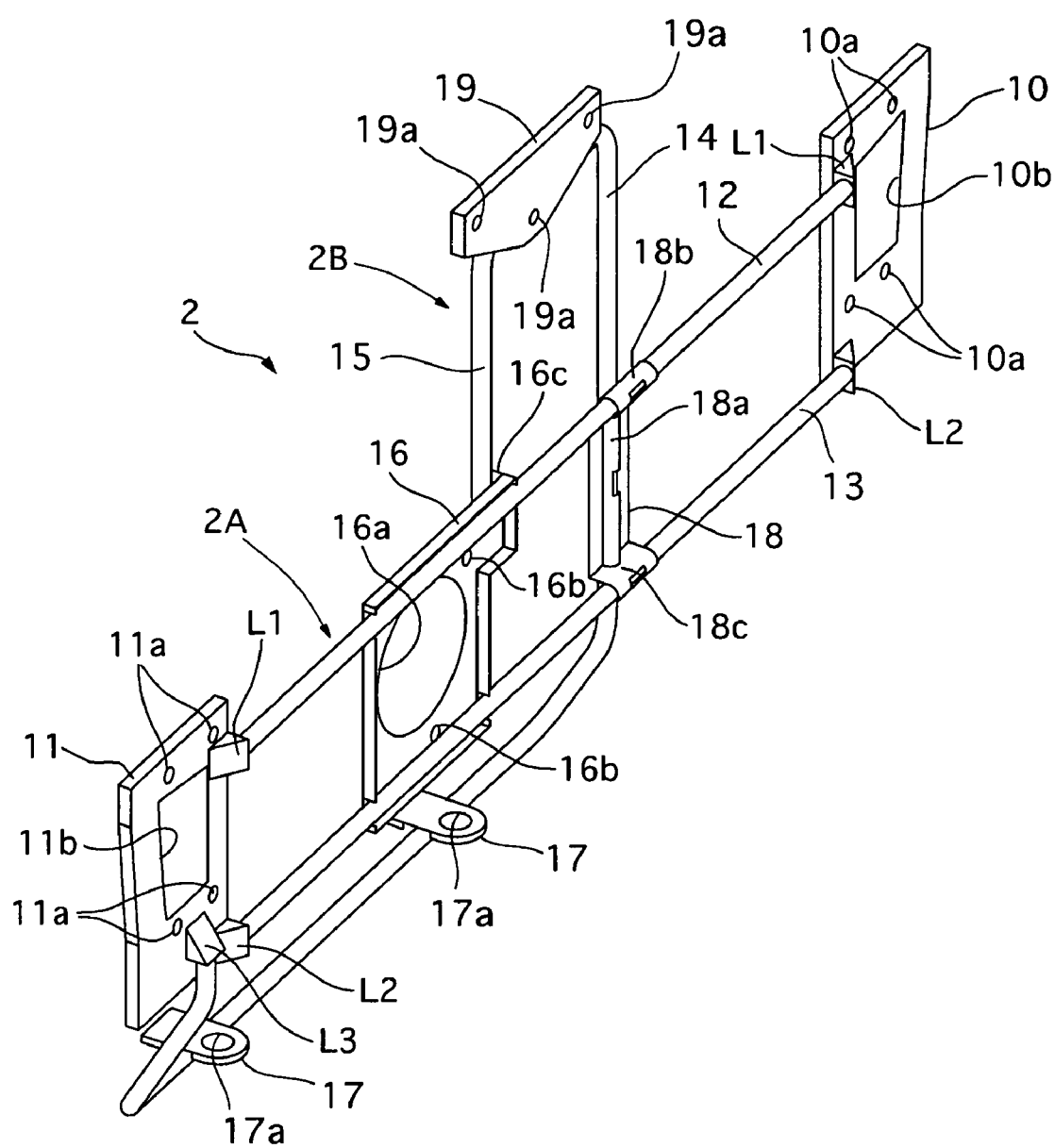
FIG. 6 is a perspective rear view showing the first metal frame and the second metal plate of the radiator core support of the embodiment.

On the other hand, as shown in FIGS. 5 and 6, the metal part 2 includes the first metal frame 2A, the second metal frame 2B, a right fixing panel 10 and a left fixing panel 11. The right fixing panel 10 and the left fixing panel 11 correspond to a right fixing member and a left fixing portion of the invention, respectively.

The right fixing panel 10 and the left fixing panel 11 are made from metal material, and their peripheral portions are bent frontward. They are formed with bolt-holes 10a and 11a at their four corners, and have square openings 10b and 11b at their center portion, respectively, so that they can be secured on a right side member 21 and a left side member 22 of the motor vehicle body by not-shown bolts, respectively.

The first metal frame 2A consists of the upper beam 12 extending in the lateral direction when the radiator core support RA is mounted on the motor vehicle body, and the lower beam 13 arranged under and in parallel with the upper beam 12. The upper beam 12 and the lower beam 13 are formed in a pipe shape, and have joint members L1 and L2 at their both end portions, respectively, as shown in FIG. 6. The joint members L1 and L2 are welded on rear surfaces of the right fixing panel 10 and the left fixing panel 11, so that he right fixing panel 10 and the left fixing panel 11 are tightly joined with each other through the upper beam 12 and the lower beam 13.

The upper beam 12 and the lower beam 13 are provided at their front sides with a fan fixing panel 16 made from metal. The fan fixing panel 16 is formed in a substantially square shape having a supporting portion 16c projecting rightward from its upper portion. A peripheral portion of the fan fixing panel 16 is bent rearward, so that the peripheral portion is welded on the upper beam 12 and the lower beam 13 and the supporting portion 16c is welded on the second beam 15. The fan fixing panel 16 is further formed with a circular opening 16a for receiving the fan motor unit 20 and three bolt-holes 16b for fixing the fan motor unit 20 around the circular opening 16a.

The second metal frame 2B consists of the first beam 14 and the second beam 15, which are formed like a pipe.

As shown in FIG. 5, the first beam 14 has a first connecting portion 14a, a second connecting portion 14b whose left end portion is continuously connected with a lower end portion of the first connecting portion 14a, a third connecting portion 14c whose lower end portion is continuously connected with a right end portion of the second connecting portion 14b, and a fourth connecting portion 14d whose lower end portion is continuously connected with an upper end portion of the third connecting portion 14c.

The first connecting portion 14c has a joint member L3 on its upper end portion, so that the joint member L3 is welded on the rear surface of the left fixing panel 11, and extends forward and obliquely downward. The second connecting portion 14b extends in the lateral direction at a front side of the first metal beam 2A, and is provided with two fixing portions 17 having through-holes 17a for receiving the mounting pins P1 and P2 of the heat exchanger 24. The fixing portions 17 correspond to a second fixing portion of the present invention. The third connecting portion 14c extends forward and obliquely downward from the lower end portion of the fourth connecting portion 14d, whose intermediate portion is welded on a connecting panel 18 at this front side, being held by a holding portion shaped in a half circular cylinder. The connecting panel 18 is welded on the upper beam 12 and the lower beam 13 at its upper end portion and its lower end portion, respectively. Specifically, the upper end portion and the lower end portion of the connecting panel 18 are formed to have an upper half circular cylinder portion 18b for holding the upper beam 12 and a lower half circular cylinder portion 18c for holding the lower beam 13, respectively. The fourth connecting portion 14d extends vertically, and its upper end portion is bent leftward to have a joint member L4, which is welded on a front surface of a hood-lock fixing member 19. The hood-lock fixing member 19 corresponds to a first fixing portion of the present invention.

The second beam 15 is formed like a pipe to extend vertically, and is welded at its lower end portion on a front surface of the supporting portion 16c of the fan fixing panel 16. An upper portion of the second beam 15 is bent rightward to have a joint member L5, which is welded on the front surface of the hood-lock fixing member 19.

The hood-lock fixing member 19 is formed like a triangle shape, and has three bolt-holes 19a for fixing a hood lock 23 shown in FIGS. 7 to 10.

The radiator core support of the embodiment is constructed as follows.

The fan motor unit 20, in which a fan motor 20a and a fan 20c are not assembled, and hood lock 23 are prepared.

The radiator core support main body 1 is formed by using the injection molding machine so as to be prepared for assembly with the metal part 2.

The metal part 1 is obtained by welding the first metal frame 2A, the second metal frame 2B, the right fixing panel 10 and the left fixing panel 11 to be fixed with one another so as to be prepared for assembly with the radiator core support main body 1 and other supported objects, which are the fan motor unit 20 and hood lock 23 in this embodiment.

As shown in FIGS. 2 and 3, the metal part 2 is fixed to the radiator core support main body 1 to form the radiator core support RA by using the following means. The clipping portions 8a of the radiator core support main body 1 hold corresponding portions of the upper beam 12 and the lower beam 13 so that the first metal frame 2A and the radiator core support can be fixed to each other. In this fixed state, the fourth connecting portion 14d of the first beam 14 of the second metal frame 2B is in contact with the supporting portion 8b of the radiator core support main body 1, and the holding bracket portion B1 formed on the radiator core support left side panel portion 6 holds the first connecting portion 14a of the second beam 14, so that the metal part 2 can be fixed to the radiator core support main body 1, being positioned in the lateral direction relative to the radiator core support main body 1.

Then, as shown in FIGS. 7 and 8, the fan motor is inserted into the circular opening 16c of the fan fixing panel 16 from its rear side, and is fixed to the fan fixing panel 16 by using not-shown bolts penetrating through bolt-holes 16b of the fan fixing panel 16 and their corresponding bolt-holes 20b of the fan motor 20a. The fan 20c is brought from a front side of the fan fixing panel 16 to be fixed to an output shaft of the fan motor 20a, so that the fan 20c is arranged in the opening 9 of the left fan-shroud panel portion 8L of the radiator core support main body 1. The fan motor 20a may be inserted from the front side of the fan fixing panel 16 to be fixed thereto.

The right fixing panel 10 and the left fixing panel 11 are fixed to the right side member 21 and the left side member 22 of the motor vehicle body by using not-shown bolts penetrating through the bolt-holes 10a of the right fixing panel 10, the bolt-holes 11a of the left fixing panel 11, bolt-holes 21a of the right side member 21 and bolt-holes 22a of the left side member 22, respectively. Thus, the radiator core support RA is mounted on the front portion of the motor vehicle body.

The hood lock 23 is fixed on the hood-lock fixing member 19 by using not-shown bolts penetrating through the bolt-holes 19a of the hood-lock fixing member 19 and their corresponding bolt-holes 23a of the hood lock 23.

Then, as shown in FIGS. 9 and 10, the heat exchanger 24 is mounted on the radiator core support RA as follows. Incidentally, a radiator or a condenser, or a radiator integrated with a condenser is used as the heat exchanger 24.

The heat radiator 24 is brought up over, and the mounting pins P1 and P2 projecting downward from the bottom portion thereof are inserted into the through-holes 17a through mount members M1 and M2 which are made of elastic material, such as rubber, and are formed like a substantially circular cylinder. In this mounted state, the heat exchanger 24 faces the fan 20c, and its ports 24a and 24b are inserted into through-holes 8c and 8d formed on the left fan-shroud panel portion 8L, respectively, so that the ports 24a can be connected with not-shown hoses or the like. Incidentally, two mounting pins P3 and P4 formed on a top portion of the heat exchanger 24 are fixed to the radiator core support main body 1 by not-shown brackets.

The radiator core support RA of the embodiment has the following advantages.

The radiator core support RA is constructed in such that the radiator core support main body 1 is made of the plastic material and the metal part 2 is fixed to the radiator core support main body 1, where the metal part 2 includes the right fixing panel 10, the left fixing panel 11, the upper beam 12, the lower beam 13, the first beam 14 and the second beam 15. The first metal frame 2A acts as a beam structure between the right side member 21 and the left side member 22 of the motor vehicle body, thereby increasing the rigidity of the entire radiator core support RA and decreasing its excessive portions and weight.

The right side member 21 and the left side member 22 are connected by the metal part 2 including the right fixing panel 10, the left fixing panel 11, and the first metal frame 2A consisting of the upper beam 12 and the lower beam 13. Therefore, the motor vehicle body can increase its rigidity, improving stability and controllability of the motor vehicle.

In addition, in this radiator core support RA of the embodiment, the first metal frame 2A can tightly and stably support the fan motor unit 20.

The first metal frame 2A fixes the second metal frame 2B attached with the supported objects such as the heat exchanger 24 and/or the hood lock 23, and accordingly the subject objects can be tightly and stably supported by the radiator core support RA. The heat exchanger 24 is heavy, and the hood lock 23 is applied by large force from the engine hood, but they are supported by the motor vehicle body through the metal part 2, including the right side member 21, the left side member 22, the first metal frame 2A, and the second metal frame 2B.

In addition, the first metal frame 2A consists of the upper beam 12 and the lower beam 13, which can provide higher rigidity and stably supporting, decreasing weight of the radiator core support RA. The second metal frame 2B consists of the first beam 14 and the second beam 15, which are connected with the first metal frame 2A. Therefore, the second frame 2B does not need to extend toward the right side member 21 and the left side member 22, which can enable the second metal frame 2B to be constructed in a smaller size and lower weight, keeping high rigidity for supporting the supported objects.

While there have been particularly shown and described with reference to preferred embodiments thereof, it will be understood that various modifications may be made therein, and it is intended to cover in the appended claims all such modifications as fall within the true spirit and scope of the invention.

For example, configurations of the radiator core support main body RA and the metal part 2 may be changed arbitrarily, and connecting means of parts thereof may be also changed arbitrarily. For example, the radiator core support main body 1 and the metal part 2 may be fixed with each other by using resin molding. Instead of using the joint members L1 and L2, they are removed, and the both end portions of the upper beam 12 and the lower beam 13 may be flattened out to be welded directly on the rear surfaces of the right fixing panel 10 and the left fixing panel 11. Similarly, instead of using the joint members L3, L4 and L5, they are removed, and the upper portions of the first connecting portion 14a and the fourth connecting portion 14d of the first beam 14, the second and the second beam 15 may be flattened out to be welded directly to the left fixing panel 11 and the hood-lock fixing member 19, respectively.

The supported objects may employ a bumper armature, a head lump, an air guide and others, instead of or in addition to the heat exchanger 24 and the hood lock 23.

The entire contents of Japanese Patent Application No. 2005-358370 filed, Dec. 13, 2005 are incorporated herein by reference.

What is claimed is:

1. A radiator core support comprising:
   a radiator core support main body that is a panel made of plastic material, the radiator core support main body being formed with a through-hole;
   a right fixing member and a left fixing member that are made of metal to be fixed on a right side member and a left side member of a motor vehicle body, respectively;
   a first metal frame extending in a lateral direction of the motor vehicle body for connecting the right fixing member and the left fixing member with each other and for supporting the radiator core support main body;
   a second metal frame that is connected with the first metal frame to extend vertically at an intermediate portion of the first metal frame, the second metal portion being provided with a fixing portion having a through-hole for fixing a heat exchanger through the through-hole of the radiator core support main body; and
   a fan fixing member that is connected with the first metal frame, the fan fixing member configured to fixing a fan motor.

2. The radiator core support according to claim 1, wherein the first metal frame includes two beams consisting of an upper beam and a lower beam that are arranged apart vertically from each other and in parallel with each other, the two beams being connected at both end portions thereof with each other through the right fixing member and the left fixing member, respectively, the two beams being connected at intermediate portions thereof with the fan fixing member, and the two beams being connected at right end portions and left end portions thereof with the right fixing member and the left fixing member.

3. The radiator core support according to claim 2, wherein the second metal frame is provided at a top portion thereof with a hood-lock fixing member for fixing a hood lock.

4. The radiator core support according to claim 2, wherein the second metal frame includes two beams arranged apart from each other and in parallel with each other.

5. The radiator core support according to claim 4, wherein one beam of the second metal frame is connected with the upper beam of the first metal frame, and the other beam of the second metal is connected with the upper beam and the lower beam of the second metal beam.

6. The radiator core support according to claim 1, wherein the second metal portion is provided at a top portion thereof with a hood-lock fixing member for fixing a hood lock.

7. The radiator core support according to claim 6, wherein the second metal frame includes two beams arranged apart from each other and in parallel with each other.

8. The radiator core support according to claim 7, wherein one beam of the second metal frame is connected with the upper beam of the first metal frame, and the other beam of the second metal is connected with the upper beam and the lower beam of the second metal beam.

9. The radiator core support according to claim 1, wherein the first metal frame includes two beams consisting of an upper beam and a lower beam that are arranged apart vertically from each other and in parallel with each other, and the fan fixing member is connected with the upper beam and the lower beam at intermediate portions thereof.

10. The radiator core support according to claim 1, wherein the second metal frame includes two beams arranged apart from each other and in parallel with each other.

11. The radiator core support according to claim 1, wherein one beam of the second metal frame is connected with the upper beam of the first metal frame, and the other beam of the second metal is connected with the upper beam and the lower beam of the second metal beam.

12. The radiator core support according to claim 1, wherein at least one of the first frame and the second frame is a pipe.

13. The radiator core support according to claim 1, wherein the radiator core support main body is formed with an opening for flowing air toward a fan motor unit and with a portion containing the heat radiator.

14. The radiator core support according to claim 1, wherein the right fixing member and the left fixing member are metal panels.

\* \* \* \* \*